United States Patent

Fukuoka et al.

Patent Number: 5,456,896
Date of Patent: Oct. 10, 1995

[54] PREPARATION OF HIGH ALPHA-TYPE SILICON NITRIDE POWDER

[75] Inventors: Hirofumi Fukuoka; Masaki Watanabe; Yoshiharu Konya, all of Annaka; Masanori Fukuhira, Takasaki, all of Japan

[73] Assignee: Shin-Etsu Chemical Co., Ltd., Tokyo, Japan

[21] Appl. No.: 273,829

[22] Filed: Jul. 12, 1994

[30] Foreign Application Priority Data

Jul. 16, 1993 [JP] Japan ................ 5-199243

[51] Int. Cl.⁶ ................ C01B 21/068
[52] U.S. Cl. ................ 423/344
[58] Field of Search ................ 423/344

[56] References Cited

U.S. PATENT DOCUMENTS

| | | | |
|---|---|---|---|
| 4,127,630 | 11/1978 | Washburn | 423/344 |
| 4,517,168 | 5/1985 | Kawahito et al. | 423/344 |
| 5,032,370 | 7/1991 | Merzhanov et al. | 423/344 |
| 5,073,358 | 12/1991 | Shimizu et al. | 423/344 |
| 5,232,677 | 8/1993 | Fukuoka et al. | 423/344 |
| 5,344,634 | 9/1994 | Edler | 423/344 |

FOREIGN PATENT DOCUMENTS

| | | | |
|---|---|---|---|
| 2350031 | 4/1974 | European Pat. Off. | |
| 0186497 | 7/1986 | European Pat. Off. | |
| 0442032 | 8/1991 | European Pat. Off. | |
| 199707 | 11/1983 | Japan | 423/344 |
| 147807 | 6/1988 | Japan | 423/344 |
| 248308 | 10/1990 | Japan | 423/344 |
| 114907 | 4/1992 | Japan | 423/344 |
| 7010941 | 2/1971 | Netherlands | 423/344 |

OTHER PUBLICATIONS

Patent Abstracts of Japan, vol. 013, No. 501 (C–652) 10 Nov. 1989 & JP–A–01 201 012 (Japan Metals & Chem Co., Ltd.) 14 Aug. 1989.

European Patent Application 0410459A2 published Jan. 30, 1991.

*Primary Examiner*—Wayne Langel
*Attorney, Agent, or Firm*—McAulay Fisher Nissen Goldberg & Kiel

[57] ABSTRACT

Silicon nitride powder is prepared by nitriding metallic silicon powder in a nitriding gas atmosphere at a temperature of 1,000° C.–1,500° C. Midway the nitriding step, the nitrided product is heat treated in an inert non-oxidizing gas atmosphere or vacuum at a temperature higher than the nitriding temperature, but lower than 1,600° C. The product is nitrided again, obtaining high α-content silicon nitride powder.

7 Claims, No Drawings

PREPARATION OF HIGH ALPHA-TYPE SILICON NITRIDE POWDER

BACKGROUND OF THE INVENTION

1. Field of the Invention

This invention relates to a process for effectively preparing silicon nitride powder having a high alpha-type content.

2. Prior Art

In the prior art, silicon nitride powder is generally prepared by the direct nitriding reaction of metallic silicon powder in a non-oxidizing atmosphere containing nitrogen gas or ammonia gas at a temperature of 1,000 to 1,500° C. This process, however, has the problem that once nitriding starts, a great amount of reaction heat is generated by the following reaction scheme:

$$3Si+2N_2=Si_3N_4$$

$$\Delta H_R = -176 \text{ kcal/mol}$$

to rise the temperature of the reaction system so that the amount of beta-type silicon nitride powder which is stable at higher temperature is increased. As a consequence, it was difficult to prepare high alpha-type silicon nitride powder having an alpha content of higher than 90%.

Then in order to produce silicon nitride powder at a high alpha conversion rate, several approaches were taken including (i) addition of a catalyst as disclosed in Japanese Patent Application Kokai (JP-A) 15499/1979, (ii) slowing down the heating rate as disclosed in JP-A 24300/1979, and (iii) use of starting silicon powder with a finer particle size as disclosed in JP-A 41048/1983. Undesirably, the catalyst added in method (i) would be left in the nitride product as an impurity. Method (ii) suffered from low productivity. Method (iii) required a substantial cost in comminuting the starting metallic silicon powder.

SUMMARY OF THE INVENTION

Therefore, an object of the present invention is to provide a novel and improved process for preparing high alpha-type silicon nitride powder in high yields by a direct nitriding method without using a catalyst.

The inventors made investigations on a process for preparing silicon nitride powder by nitriding metallic silicon powder in a nitriding gas atmosphere. We have found that better results are obtained when nitriding is effected at a nitriding temperature in the range of 1,000° C. to 1,500° C., and midway the nitriding step, the nitrided product is subject to high temperature treatment in an inert non-oxidizing gas atmosphere or vacuum at an elevated temperature from higher than the nitriding temperature to 1,600° C.

As a first step for effectively nitriding metallic silicon powder produce high alpha-type silicon nitride powder, we analyzed the nitriding mechanism. With respect to a simple gas-solid reaction mechanism, there were proposed a number of reaction models assuming that the diffusion of reactant gas into the product is rate determinate (unreacted nuclear model).

However, in the reaction of metallic silicon powder with nitrogen gas to produce silicon nitride powder, the diffusion of nitrogen into a silicon nitride film is slower than the diffusion of nitrogen into metallic silicon by a factor of $10^4$ (see K. Kijima and S. Shirasaki, J. Chem. Phys., 65, 7, 2668 (1976)). Then, once a silicon nitride film is formed on the surface of metallic silicon, this silicon nitride film becomes a barrier against nitrogen diffusion and reaction no longer proceeds. This fact is well known, but the phenomenon cannot be fully explained by the above-mentioned unreacted nuclear model.

Therefore, in order to explain the phenomenon that reaction proceeds even though a silicon nitride film forms on the surface of metallic silicon, a number of hypotheses have been presented regarding the analysis of the nitriding mechanism between metallic silicon and nitrogen. Some typical hypotheses are briefly explained.

(1) Silicon migrates toward silicon nitride nuclei formed on the Si surface, reacting with nitrogen. (See A. Atokinson, P. J. Leatt, A. J. Moulson, E. W. Roberts, J. Mat. Sci., 9, 981 (1974).)

(2) Gas phase reaction hypothesis. SiO vapor reacts with nitrogen to form α-type silicon nitride while Si vapor reacts with nitrogen to form β-type silicon nitride. (See D. Campos-Loriz, F. L. Riley, J. Mat. Sci. Let., 11, 195 (1976).)

(3) A silicone nitride film formed on Si surface cracks and strips with the progress of reaction whereupon metallic silicon thus exposed at the surface reacts with nitrogen. (See Y. Inomata, Y. Uemura, Yogyo-Kyokai-Shi, 83, 244 (1975).)

We made a confirmation test using angular, high purity, single crystal, metallic silicon to find that when a nitrided product which has been nitrided in a relatively low temperature range of 1,200 to 1,300° C. is nitrided again in a high temperature range of about 1,400° C., the silicon nitride film over the surface of metallic silicon is stripped and chipped away. We thus reached the conclusion that hypothesis (3) is probable. It is believed that the stresses by which the silicon nitride film is stripped are induced by the differential thermal expansion between metallic silicon and silicon nitride and the vapor pressures of metallic silicon, silicon monoxide and other gases given off by the metallic silicon.

In general, silicon nitride powder is prepared by heating in a nitriding gas atmosphere and effecting nitriding at a temperature in the range of about 1,100 to 1,500° C. With the above finding taken into account, it is presumed that during the heating step, nitriding and stripping of silicon nitride film take place at the same time. Then if one intends to increase the percent nitride conversion and the nitriding rate, high temperature reaction is unavoidable. It is then difficult to efficiently produce silicon nitride with high alpha-conversion.

Then we made further investigations to seek for a means capable of effectively stripping the silicon nitride film once formed on the metallic silicon surface to expose a fresh metallic silicon surface. We conceived that it would be effective if the nitriding step and the silicon nitride stripping step were carried out separately. Silicon is nitrided at a temperature in the range of 1,000 to 1,500° C. to form a partially nitrided product. This partially nitrided product is then subject to heat treatment at a temperature higher than the nitriding temperature, but lower than 1,600° C. and in an inert non-oxidizing gas atmosphere which is free of a nitriding gas and thus does not provide nitriding or in vacuum, thereby accomplishing stripping of the silicon nitride film. Thereafter nitriding reaction is resumed. This nitriding-heat treatment-nitriding process provides for not only higher rate of reaction even when nitriding is at relatively low temperature, but also higher alpha-conversion because of the low nitriding temperature. As a consequence, high α-type silicon nitride powder can be produced in an efficient manner.

Accordingly, the present invention provides a process for preparing high alpha-type silicon nitride powder by nitriding metallic silicon powder in a nitriding gas atmosphere at a nitriding temperature in the range of 1,000° C. to 1,500° C., preferably in the range of 1,200° C. to 1,300° C. Midway the nitriding step, the nitrided product is subject to at least one high-temperature treatment in an inert non-oxidizing gas atmosphere or vacuum at a temperature from higher than the nitriding temperature to 1,600° C., preferably at a temperature of from the nitriding temperature +50° C. to 1,600° C.

DETAILED DESCRIPTION OF THE INVENTION

The present invention provides a process for preparing high alpha-type silicon nitride powder by nitriding metallic silicon powder in a nitriding gas atmosphere at a nitriding temperature to form a silicon nitride powder wherein the process is divided into a nitriding step and a silicon nitride film stripping step. At least one silicon nitride film stripping step or high temperature treatment step intervenes the nitriding step. That is, a silicon nitride film stripping step or high temperature treatment step is interposed between early and later stages of the nitriding step.

The nitriding step including both the early and later stages is to nitride metallic silicon powder in a non-oxidizing gas atmosphere containing nitrogen gas or ammonia gas which may be at atmospheric pressure or reduced pressure. The metallic silicon powder as the source is not particularly limited although a 150-mesh pass fraction, especially a 325-mesh pass fraction of metallic silicon particles is preferred because metallic silicon particles having a larger size would sometimes require an increased number of silicon nitride film stripping steps. For accelerating nitriding reaction, Ca, Fe, Cu or compounds thereof may be added as a catalyst.

The nitriding temperature should be in the range of 1,000° C. to 1,500° C., preferably 1,200° C. to 1,300° C. The remaining conditions are the same as in a conventional direct nitriding process.

In the practice of the invention, the nitriding gas feed is interrupted at a midpoint of the nitriding step, preferably at a point corresponding to a rate of reaction of about 60 to 80%. The atmosphere is replaced by an inert non-oxidizing gas atmosphere or vacuum. The partially nitrided product is subject to high temperature treatment in the atmosphere or vacuum to thereby strip the silicon nitride film formed on the metallic silicon surface.

The atmosphere used in the high temperature treatment is free of a nitriding gas such as nitrogen and ammonia and instead, contains one or more inert gases which do not participate in the reaction and are inert to metallic silicon, for example, such as argon, helium and hydrogen. Vacuum is also useful. The treating temperature is an elevated temperature which is higher than the nitriding temperature, preferably at least 50° C. higher than the nitriding temperature and lower than 1,600° C. (inclusive), preferably lower than 1,500° C. If the treating temperature is equal to or lower than the nitriding temperature, no stripping of the silicon nitride film occurs. At a higher treating temperature in excess of 1,600° C., the once formed alpha-type silicon nitride is susceptible to sublimation and decomposition and undergoes a phase transition into beta-type silicon nitride. The treating time is not critical and varies with the treating temperature. For example, the treatment may be effected for about 30 to 120 minutes at 1,300° C. or for about 5 to 60 minutes at 1,400° C.

For the high temperature treatment, any desired apparatus may be used. Typically the same furnace as used in nitriding, for example, a batch furnace and tunnel furnace is used. A fluidized bed system such as a free fluidized bed and circulatory fluidized bed as well as a particle migration system such as a rotary kiln and vertical column are preferred for moving particles for efficient stripping of the silicon nitride film.

The early stage of nitriding, high temperature treatment, and later stage of nitriding may use either separate furnaces or a common furnace.

In one embodiment, silicon is nitrided in a fixed bed reaction system such as a batch furnace and tunnel furnace, and the nitrided product is subject to high temperature treatment in a fluidized bed system or particle migration system. Preferably, the nitrided product is disintegrated into fragments of less than 30 mm prior to the high temperature treatment.

At the end of high temperature treatment, the nitriding step is resumed, obtaining high alpha-type silicon nitride. This later stage of nitriding may use the same conditions as the early stage although different conditions may be employed within the above-mentioned range.

The high temperature treatment is not limited to a single cycle and may be done two or more cycles. If desired, high temperature treatment and nitriding steps are alternately repeated over a plurality of sets. The number of high temperature treatment steps is not critical. Many steps are preferred from the standpoint of a high alpha-conversion since it is then advantageous that reaction takes place in the vicinity of the surface such that reaction heat may not accumulate within the solid. Inversely, less steps are preferred from the standpoint of productivity. A preferred compromise is one to five cycles of high temperature treatment.

According to the present process, nitriding reaction can be driven to completion within a short time even at a relatively low nitriding temperature. Then high alpha content silicon nitride can be produced in high yields.

EXAMPLE

Examples of the present invention are given below by way of illustration and not by way of limitation.

Examples 1–11 & Comparative Examples 1–5

A tray of silicon nitride was charged with 200 grams of metallic silicon powder having the mean particle size shown in Table 1. The tray was placed in a box-type high temperature atmosphere furnace wherein first nitriding was effected under the conditions shown in Table 1 using nitrogen gas containing 20% by volume of hydrogen gas as a nitriding gas.

The nitriding gas supply was interrupted and instead, the gas shown in Table 1 was introduced into the furnace. High temperature treatment was effected under the conditions shown in Table 1.

Then second nitriding was effected under the conditions shown in Table 1, obtaining silicon nitride.

In some examples, this silicon nitride product was subsequently subject to second high temperature treatment and third nitriding under the conditions shown in Table 1.

The resulting silicon nitride products were analyzed by X-ray diffractometry to determine alpha-conversion and rate of reaction. The results are shown in Table 1.

TABLE I

| | Example | | | | | | | |
|---|---|---|---|---|---|---|---|---|
| | 1 | 2 | 3 | 4 | 5 | 6 | 7 | 8 |
| Metallic Si powder mean particle size, μm | 4.2 | 4.2 | 4.2 | 4.2 | 4.2 | 4.2 | 4.2 | 4.2 |
| First nitriding | | | | | | | | |
| Temp. °C. | 1250 | 1250 | 1250 | 1250 | 1250 | 1250 | 1250 | 1200 |
| Residence time, hr. | 3 | 3 | 3 | 3 | 3 | 3 | 3 | 7 |
| High-temperature treatment | | | | | | | | |
| Temp. °C. | 1400 | 1300 | 1500 | 1400 | 1400 | 1400 | 1400 | 1400 |
| Treating time, hr. | 0.5 | 0.5 | 0.5 | 0.5 | 0.5 | 0.05 | 3 | 0.5 |
| Treating gas | Ar | Ar | Ar | Ar + | He | Ar | Ar | Ar |
| Second nitriding | | | | | | | | |
| Temp., °C. | 1250 | 1250 | 1250 | 1250 | 1250 | 1250 | 1250 | 1200 |
| Residence time, hr. | 3 | 3 | 3 | 3 | 3 | 3 | 3 | 7 |
| Second high-temperature treatment | | | | | | | | |
| Temp., °C. | — | — | — | — | — | — | — | — |
| Treating time, hr. | — | — | — | — | — | — | — | — |
| Treating gas | — | — | — | — | — | — | — | — |
| Third nitriding | | | | | | | | |
| Temp. °C. | — | — | — | — | — | — | — | — |
| Residence time, hr. | — | — | — | — | — | — | — | — |
| Rate of reaction, % | 99.2 | 96.3 | 99.0 | 99.4 | 100 | 99.0 | 99.2 | 94.8 |
| α-conversion, % | 95.3 | 96.4 | 94.6 | 95.1 | 94.8 | 95.3 | 94.9 | 96.9 |

| | Example | | | Comparative Example | | | | |
|---|---|---|---|---|---|---|---|---|
| | 9 | 10 | 11 | 1 | 2 | 3 | 4 | 5 |
| Metallic Si powder mean particle size, μm | 4.2 | 23.5 | 23.5 | 4.2 | 23.5 | 4.2 | 4.2 | 4.2 |
| First nitriding | | | | | | | | |
| Temp. °C. | 1250 | 1250 | 1250 | 1250 | 1250 | 1400 | 1250 | 1250 |
| Residence time, hr. | 3 | 3 | 3 | 6 | 6 | 3 | 3 | 3 |
| High-temperature treatment | | | | | | | | |
| Temp. °C. | 1400 | 1400 | 1400 | — | — | — | 1250 | 1250 |
| Treating time, hr. | 0.5 | 0.5 | 0.5 | — | — | — | 0.5 | 0.5 |
| Treating gas | Ar | Ar | Ar | — | — | — | Ar | Ar |
| Second nitriding | | | | | | | | |
| Temp., °C. | 1300 | 1250 | 1250 | — | — | — | 1250 | 1250 |
| Residence time, hr. | 1 | 3 | 3 | — | — | — | 3 | 3 |
| Second high-temperature treatment | | | | | | | | |
| Temp., °C. | — | — | 1400 | — | — | — | — | — |
| Treating time, hr. | — | — | 0.5 | — | — | — | — | — |
| Treating gas | — | — | Ar | — | — | — | — | — |
| Third nitriding | | | | | | | | |
| Temp., °C. | — | — | 1250 | — | — | — | — | — |
| Residence time, hr. | — | — | 3 | — | — | — | — | — |
| Rate of reaction, % | 100 | 78.7 | 97.8 | 80.8 | 57.1 | 99.5 | 81.2 | 82.3 |
| α-conversion, % | 92.4 | 95.2 | 94.4 | 96.3 | 96.4 | 74.3 | 96.0 | 55.3 |

As seen from Table 1, a silicon nitride manufacturing method involving intervening high temperature treatment within the scope of the invention (Examples 1–11) provides for a high rate of reaction and a high α-conversion of more than 90%.

In contrast, when nitriding was effected for the same time at the same relatively low temperature as in Examples 1–7, but high temperature treatment was omitted (Comparative Examples 1–2), the rate of reaction was low despite a high α-conversion. When the nitriding temperature was high (Comparative Example 3), the α-conversion was low despite a high rate of reaction. When the high temperature treatment was at the same temperature as the nitriding temperature (Comparative Example 4), the high temperature treatment exerted no effect. When the high temperature treatment was effected at 1,650° C. (Comparative Example 5), the α-conversion was extremely low.

Example 12

A $N_2/H_2$ (20 vol%) gas mixture was admitted into a rotary kiln type reactor held at 1,250° C. A metallic silicon powder having a mean particle size of 2 to 3 μm was granulated into granules having a mean diameter of 0.5 mm. The silicon granules as a source material to be nitrided were continuously supplied to and removed from the reactor at a rate of 200 grams/hour, obtaining a nitrided product having a rate of reaction of 69% and an α-conversion of 96%.

A vertical reactor column having an inner diameter of 80 mm and a soaking region of 500 mm long was charged with the nitrided product, which was subject to high temperature treatment at 1,400° C. while being fluidized in an argon atmosphere.

Thereafter, the reactor temperature was lowered to 1,250° C. With the reactor held at 1,250° C., the atmosphere was charged to a $N_2/H_2$ gas mixture and nitriding was effected for 3 hours to complete the reaction. The resulting final nitride product was a high alpha-conversion silicon nitride powder having a rate of reaction of 100% and an α-conversion of 96%.

Japanese Patent Application No. 5-199243 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A process for preparing high alpha-type silicon nitride powder comprising the steps of:

a) subjecting metallic silicon powder to a nitriding treatment in a nitriding gas at a temperature in the range from 1000° C. to 1500° C. to produce a silicon nitride film on the powder;

b) midway the nitriding treatment of step a), interrupting the treatment and heat treating the powder therefrom in an inert oxidizing gas atmosphere free of nitriding gas or in a vacuum at a temperature in the range from higher than the nitriding temperature to 1600° C. to strip the silicon nitride film from the powder; and c) resuming the nitriding treatment of the powder obtained from step b).

2. The process of claim 1 wherein said nitriding temperature is in the range of 1,200° C. to 1,300° C. and said elevated temperature is at least 50° C. higher than the nitriding temperature.

3. The process of claim 1 wherein the nitriding treatment is interrupted at a point corresponding to a rate of reaction of about 60 to 80%.

4. The process of claim 1 wherein the heat treatment is carried out at a temperature lower than 1500° C.

5. The process of claim 1 wherein the heat treatment is carried out at a temperature of 1300° C. for about 30 to 120 minutes.

6. The process of claim 1 wherein the heat treatment is carried out at 1400° C. for about 5 to 60 minutes.

7. The process of claim 1 wherein steps a), b) and c) are repeated at least two times.

* * * * *